United States Patent [19]
McCreery et al.

[11] 3,864,799
[45] Feb. 11, 1975

[54] TOOL HOLDER

[75] Inventors: James F. McCreery, Latrobe;
Dennis G. Jones, Greensburg, both of Pa.

[73] Assignee: Kennametal Inc., Latrobe, Pa.

[22] Filed: Jan. 19, 1973

[21] Appl. No.: 325,014

[52] U.S. Cl. .................................................. 29/96
[51] Int. Cl. ............................................. B26d 1/00
[58] Field of Search ............................... 29/96, 105

[56] References Cited
UNITED STATES PATENTS

| | | |
|---|---|---|
| 3,491,421 | 1/1970 | Holloway ............................. 29/96 |
| 3,557,417 | 1/1971 | Kollar ................................. 29/96 |
| 3,683,473 | 8/1972 | Joynson .............................. 29/96 |

FOREIGN PATENTS OR APPLICATIONS

| | | | |
|---|---|---|---|
| 1,235,964 | 6/1960 | France ....................... | 29/105 R |
| 925,617 | 0/1940 | Great Britain .................. | 29/96 |
| 1,140,048 | 7/1957 | France ............................ | 29/96 |
| 946,626 | 1/1964 | Great Britain .................. | 29/96 |
| 234,468 | 7/1964 | Austria .......................... | 29/96 |
| 507,832 | 9/1920 | France ............................ | 29/96 |

*Primary Examiner*—Andrew R. Juhasz
*Assistant Examiner*—William R. Briggs
*Attorney, Agent, or Firm*—Melvin A. Crosby

[57] ABSTRACT

A tool holder, especially a heavy duty tool holder, on which a tool holder shank is provided having a pocket at one end for receiving an insert with a clamp member for clamping the insert in the pocket and having one peripheral portion engaging the side of the pocket and another peripheral portion engaging a side of the insert. The pocket may be formed in a block detachably mounted in a recess in the shank.

6 Claims, 11 Drawing Figures

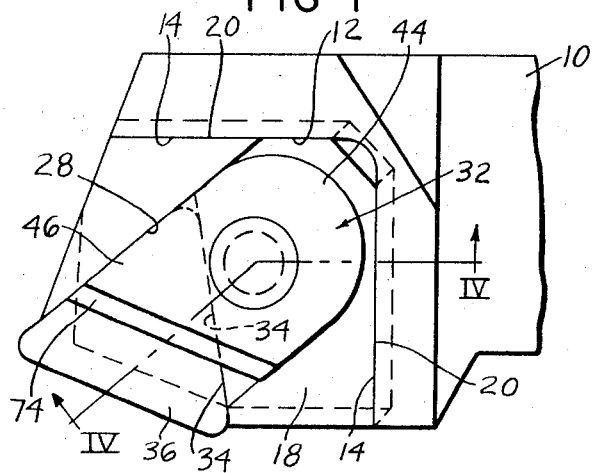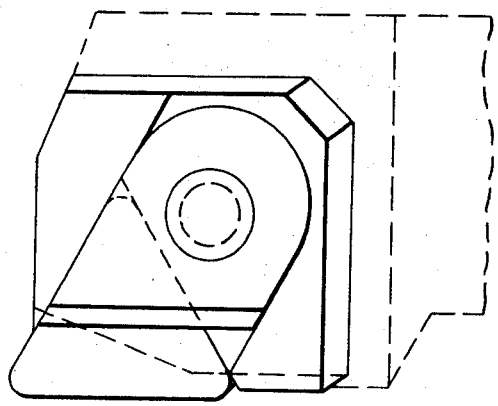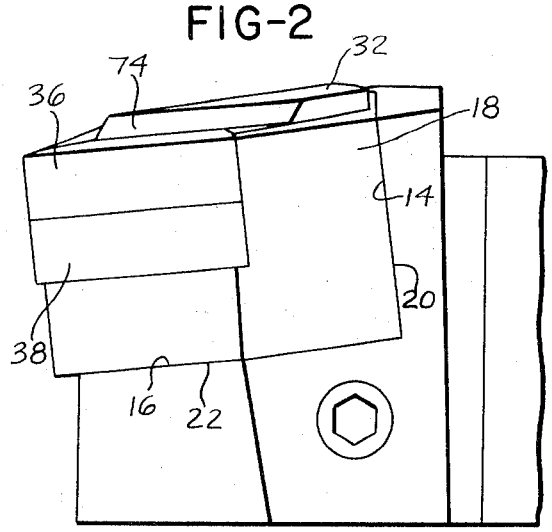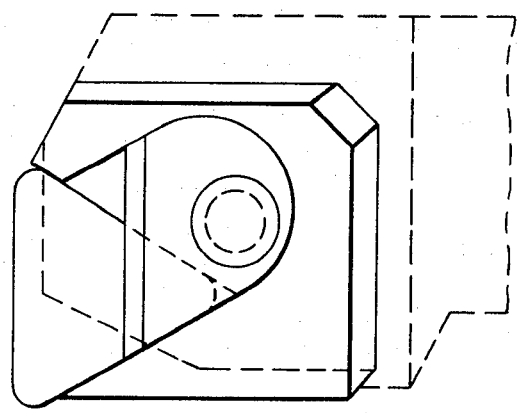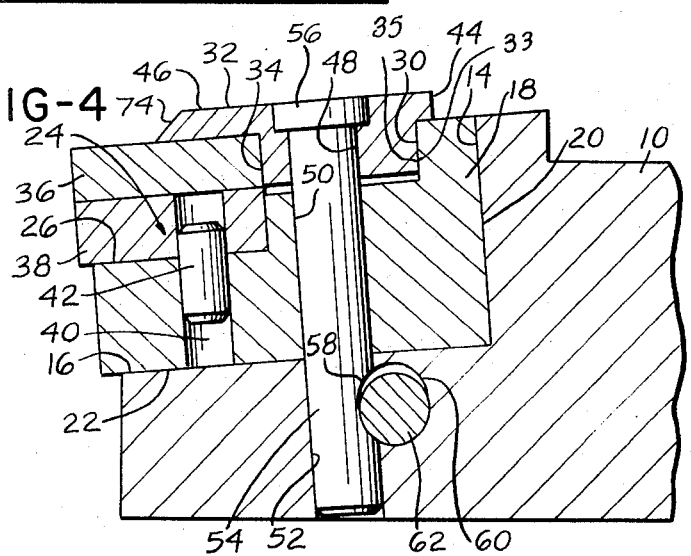

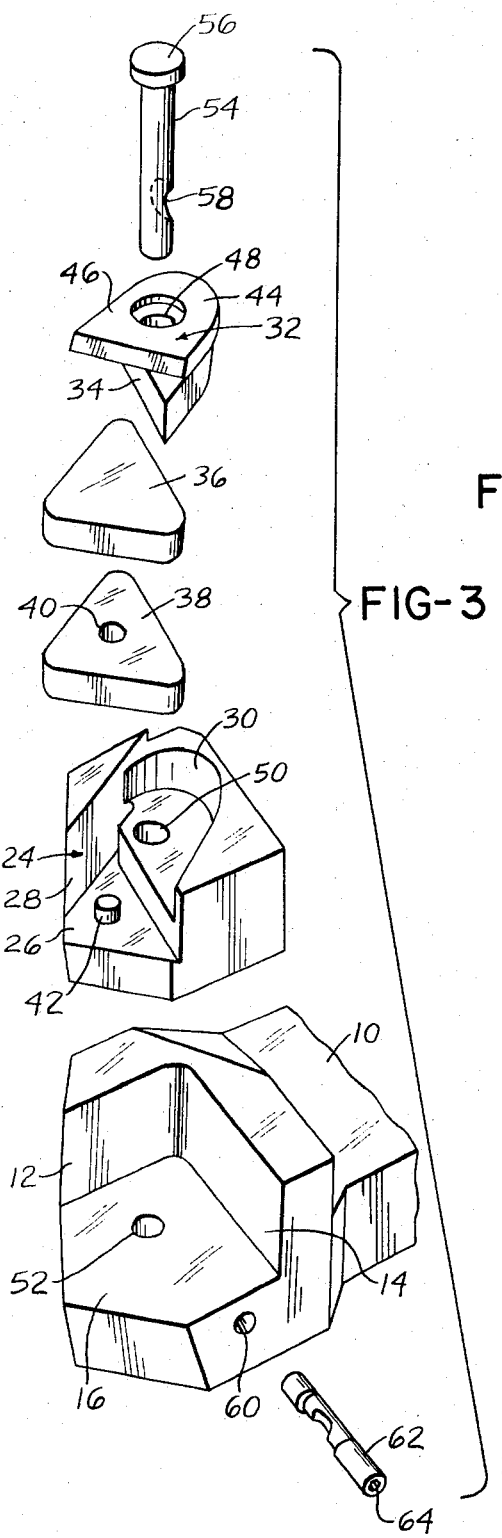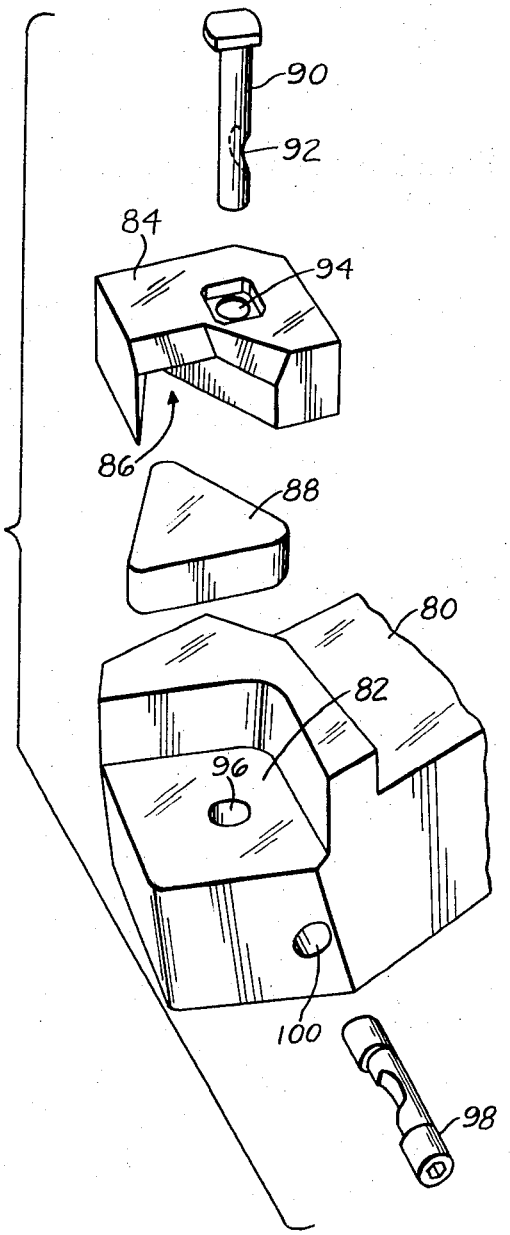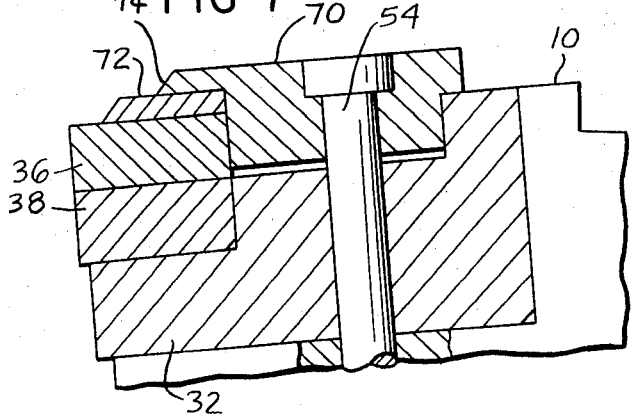

TOOL HOLDER

The present invention relates to tool holders and is particularly concerned with heavy duty tool holders of substantial size.

Tool holders for supporting inserts for turning work members are, of course, well known and take many forms. The vast majority of tool holders are relatively small and present no problems in respect of the insertion thereof into a machine tool and the removal thereof from the machine tool. However, there are also a great many tool holders employed for heavy duty operations in which the tool holder is quite heavy.

For example, a tool holder for heavy duty work might have a shank as much as four inches in diameter and might be up to 18 inches long. Such tool holders are quite heavy and present problems to a workman in placing the tool holders in a machine tool and removing them therefrom. It is in connection with tool holders of this nature that the present invention is particularly concerned, although it will become apparent that the principles of the present invention are adaptable to smaller tool holders as well.

A primary object of the present invention is the provision of a novel tool holder arrangement for supporting a cutting insert in which the changing of the insert and the adjustment of the tool holder for different working conditions can readily be accomplished without removing the entire tool holder from the machine in which it is mounted.

Another object of the present invention is the provision of a tool holder in which a portion of the shank of the tool holder can be removed together with the insert to permit changing of the insert and also to permit adjustment of the tool holder from one type of operation to another.

BRIEF SUMMARY OF THE INVENTION

In a tool holder according to the present invention, a tool shank adapted for being secured to a tool post or the like in a machine tool is provided with a pocket at the outer end for receiving a cutting insert. The cutting insert is held in place by a clamp member which has one peripheral portion engaging a side of the pocket and another peripheral portion engaging at least one side of the insert.

In one form of the invention, the pocket is formed in a block detachably mounted in a recess in the end of the tool holder with the insert being detachably secured in the pocket. The invention is particularly adapted for use in connection with large tool holders which are employed in heavy duty turning operations.

The foregoing objects as well as still other objects and advantages of the present invention will become more apparent upon reference to the following detailed specification taken in connection with the accompanying drawings in which:

FIG. 1 is a plan view looking down on a turning tool constructed according to the present invention.

FIG. 2 is a fragmentary side view showing the end of the turning tool where the cutting insert is located.

FIG. 3 is an exploded perspective showing more clearly the several parts of the turning tool of FIGS. 1 and 2.

FIG. 4 is a section indicated by line IV—IV on FIG. 1.

FIG. 5 is a fragmentary plan view showing a turning tool similar to that of FIG. 1 but with the cutting insert arranged at a somewhat different angle.

FIG. 6 is a view similar to FIG. 5 showing still another arrangement of the turning tool for presenting the insert in a still different manner.

FIG. 7 is a fragmentary section similar to FIG. 4 showing the manner in which a chip breaker can be inserted between the cutting insert and the clamp therefor.

FIG. 8 is an exploded perspective showing a modification.

DETAILED DESCRIPTION OF THE INVENTION

Figure 9:
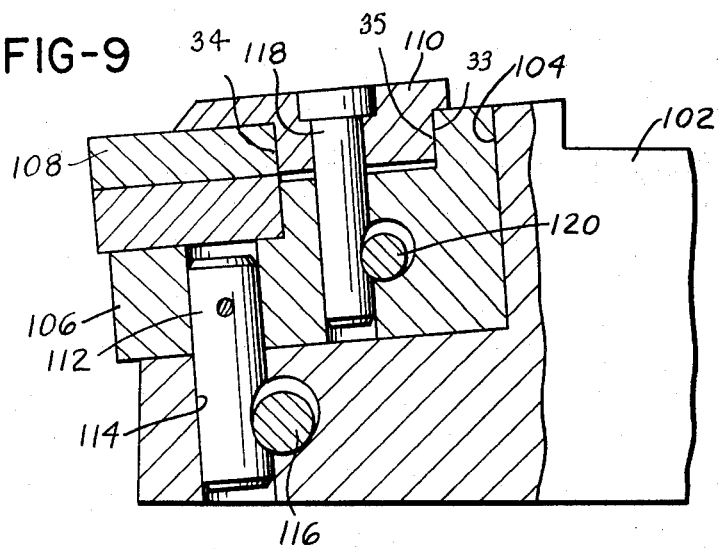
FIG. 9 is a fragmentary view partly in section showing a still further modification.

In the drawings, 10 indicates a tool shank adapted for being clamped in the tool support of a machine tool. The tool shank 10 is formed with a recess 12 at one end which has a pair of side walls 14 and an upwardly facing bottom wall 16. The walls are preferably perpendicular to one another.

A block 18 is receivable in the recess and has side walls 20 engageable with the side walls 14 of the recess and a bottom wall 22 engageable with the upwardly facing bottom wall 16 of the recess.

Block 18, in turn, is formed with a pocket 24 which opens through the top wall of the block and through the side walls of the block which face away from the side walls of recess 12. Pocket 24 has an upwardly facing bottom wall 26, preferably parallel to the bottom wall of the block, and at least one side wall 28 substantially perpendicular to the bottom wall. Pocket 24 has a laterally extending portion 30 adapted for receiving and locating a clamp member 32.

Clamp member 32, when disposed in portion 30 of pocket 24, presents a flat side wall, or peripheral portion, 34 in angular relation to side wall 28 of the pocket 24 so that walls 28 and 34 form two walls against which two sides of an insert 36 abut when the insert is placed in the pocket. Preferably, a hard shim member 38 is placed in pocket 24 beneath insert 36 and has a central hole 40 to receive a pin 42 fixed in the pocket and upstanding from the bottom therof. The insert can rest directly on the bottom wall of the insert at 26 or the shim 38 can be mounted on pin 42 and the top surface of the shim then becomes, in effect, the bottom wall of the pocket.

The clamp member 32 has a first lip 44 extending rearwardly therefrom and a second lip 46 extending forwardly therefrom and tapering to a point. As will best be seen in FIGS. 1 and 2, lip 46 serves to clamp insert 36 in the pocket in block 18 when the clamp member is pressed downwardly thereon.

Advantageously, lip 44 engages the top of the block 18 toward the rear of pocket 24 just before lip 46 engages the top of insert 36 whereby clamp member 32 will tilt slightly and thereby be certain of firmly clamping the insert 36 in position in the pocket in block 18. Clamp member 32 has at least one side wall, or peripheral portion, 33 which engages a portion of the peripheral wall 35 of the pocket. Peripheral portion 33 of the clamp member faces away from the peripheral portion 34 thereof which engages the side of the insert.

The clamp member 32 has a shouldered bore 48 extending therethrough and block 18 has a bore 50 extending therethrough which registers with bore 48 when the clamp member is in position in the pocket. Still further, a bore 52 in shank 10 registers with bore 50 when block 18 is in position in recess 12.

A pin 54 is receivable in the holes 48, 50, 52 from above, and a head 56 thereon will be receivable in the enlarged upper end of bore 48 in the clamp member. Within the range of pin 54 which is disposed within bore 52 in the shank 10, the pin has a lateral undercut 58. Bore 52 in shank 10 is intersected by a bore 60 extending laterally through the shank and mounted in bore 60 in a member 62 having a wrench socket 64 in one end. Member 62 has cylindrical end parts fitting bore 60 and an eccentric central part which is disposed adjacent undercut 58 of pin 54.

In one rotated position of member 62, pin 54 can be inserted into and removed from the aforementioned holes in the clamping member and block and tool shank and in another rotated position, the eccentric center part of member 62 engages in notch 58 of pin 54 and draws pin 54 downwardly thereby simultaneously to press clamp member 32 downwardly toward the block and shank to pull the lip 46 of the clamp member down against the top of the insert in the pocket formed in block 18 while simultaneously pulling the block 18 downwardly into fixed position in the recess 12 in tool shank 10.

FIG. 7 shows how a clamp member 70 could be made to have somewhat different dimensions than the above described clamp member 32 so as to provide space beneath the insert clamping lip of the clamp member and the insert for receiving a chip breaker element 72. In cases where the chip breaker element is not needed, it will be noted that the edge of the lip 46 of the clamping member nearest the exposed cutting edge of the insert is inclined as at 74 to carry out a chip breaking function.

The clamp member above described, can turn slightly on the clamp pin whereby the insert always takes a full bearing on the pertaining walls, or surfaces, of the pocket and clamp member.

FIG. 8 shows a modification in which a tool shank 80 is provided with a simple recess 82 therein adapted to receive from above a somewhat cubical clamp member 84 having a downwardly opening recess 86 formed therein for receiving an insert 88. A pin 90 having notch 92 therein is receivable in hole 94 in clamp member 84 and hole 96 in the tool shank for engagement by an eccentric portion of a member 98 rotatably mounted in lateral bore 100 formed in tool shank 80 and disposed to intersect hole 96 in the tool shank.

In FIG. 9, the side walls of the insert engage only the side walls of the recess in the bottom of the clamp member while the outer side of the clamp member engages the side walls of the recess in the shank.

FIG. 9 shows a modification in which a shank 102 has a recess 104 formed therein in which a block 106 is receivable with the block 106 carrying an insert 108 adapted to be held in place in the pocket provided therefor in block 106 by clamp member 110. In the FIG. 9 modification, block 106 has a pin 112 fixed thereto and extending into a hole 114 in shank 102 and which hole is intersected by a lateral bore in the shank in which a member 116 having an eccentric portion is mounted. Member 116, when actuated, will either release block 106 or will clamp it fixedly to shank 102.

A further pin 118 is provided extending through clamp member 110 and into block 106 while within block 106 is a member 120, also having an eccentric portion. Member 120 can be rotated to pull downwardly on pin 118 and thereby pull clamp member 110 down on top of insert 108. The FIG. 9 modification provides for independently connecting the block to the shank and the insert to the block.

Figure 10:
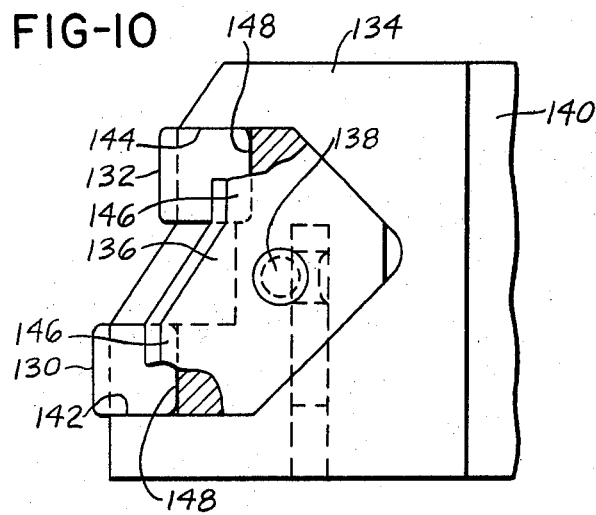
FIG. 10 shows a modification for holding two inserts.

FIG. 10 shows an arrangement in which a pair of inserts 130 and 132 can be clamped in a block 134 by a clamp member 136 which is held in place on block 134 by pin 138 and in which, in the manner already described, serves also to connect block 134 to tool shank 140.

In the FIG. 10 arrangement, block 134 is provided with slots 142 and 144 forming a part of the pocket in which the inserts 130 and 132 are disposed while the clamp member 136 has lips 146 overhanging the inserts and shoulders 148 engaging the inner sides of the inserts. The clamp member also engages the forwardly facing rear wall of the pocket formed in block 134.

Figure 11:
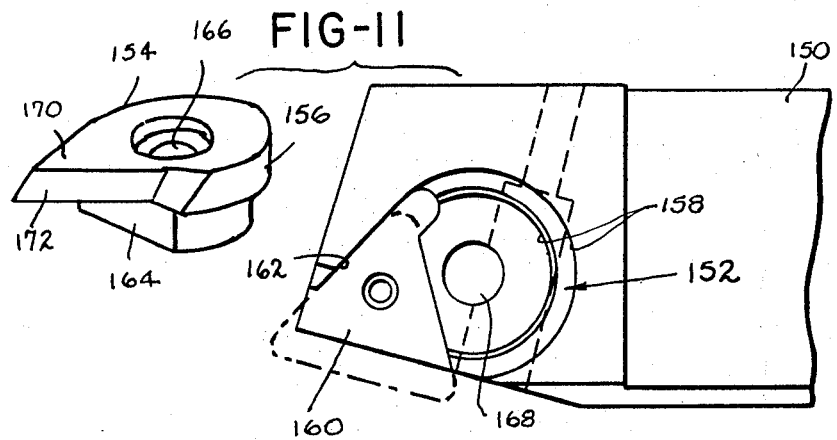
FIG. 11 shows a modification.

FIG. 11 shows a modification in which the shank 150 of a tool holder has a pocket 152 formed therein adapted for receiving a clamp member 154. Clamp member 154 has a cylindrical peripheral portion 156 engageable with the cylindrical peripheral portion 158 of the pocket 152. Pocket 152 has an upwardly facing bottom wall 160 adapted to engage the bottom face of an insert or a shim and has a linear side wall portion 162 adapted to engage the side wall of the insert.

The clamp member 154 also has a linear side wall portion 164 for engaging another side of the aforementioned insert. When the clamp member is mounted in the region provided therefor in the pocket, the side wall 164 thereof is disposed at about 120° from the side wall 162 of the pocket.

However, the clamp member 154 is rotatable on the axis of the hole 166 provided therein for a clamp pin, said clamp pin also extending into a hole 168 in the tool holder. By permitting at least a small amount of rotation of clamp member 154, it is insured that a triangular insert pushed into the pocket between walls 162 and 164 will take a sure firm bearing on both thereof and thereby be accurately located on the tool shank.

The clamp member comprises also a lip 170 which will overhang the insert and which is formed on the one side with an inclined wall 172 serving as a chip breaker region.

As in the case of the previously described modifications, the insert is located in the pocket at least partially by engagement with the clamp member which, in turn, has a peripheral portion engaging a peripheral portion of the pocket to locate the clamp member in the pocket.

A feature of the present invention is to be found in the arrangement of the clamp member wherein the required strength of the clamp member is obtained by thickening the clamp member on the underside and which thickened underside of the clamp member extends downwardly into the pocket or recess for the insert rather than projecting upwardly above the upper face of the insert.

By so forming the clamp member, a relatively low profile is obtained above the upper face of the insert for greater freedom of chip movement across the top of the turning tool. As has been mentioned, the tool of the present invention is pratically adapted for heavy turning operations which produce extremely heavy chips. Unless space is provided for such heavy chips to move away from the cutting region, difficulties can be encountered during machining operations. The low profile according to the present invention permits relatively free chip movement away from the cutting region and, thus, avoids such problems.

In addition, the edge of the clamp member facing the cutting edge is, in every case, beveled off so as to servce as a chip breaker or chip deflecting member. This further facilitates getting the chips away from the cutting region.

The chips taken in a heavy turning operation are not, themselves, heavy. These chips are difficult to break and are hot so that the chip breaking front face of the clamp member is subjected to rather severe abrasion. For this reason, it has been found advantageous to make at least this part of the clamp member relatively hard. Experimentation has developed that it is advantageous to form the clamp member from an air hardening steel, namely, a steel which, when brought up to hardening temperature, will harden upon being quenched in air.

Also, at least the inclined chip breaker surface on the clamp members can be provided with a hardening and-/or friction reducing treatment. For example, the application of a relatively thin coat of titanium carbide applied to the chip breaking surface would not only make it more resistant to abrasion, but will also reduce the friction thereof and also reduce the force required to push chips across the surface.

Such a titanium carbide coating can be applied in any of several well known manners, as by vapor deposition from a heat decomposable titanium bearing gaseous compound together with a heat decomposable carbon bearing compound which are brought together to the surface to be coated while the surface is hot.

It has also been found that treatment of the chip breaking surface of the clamp member by a boradizing treatment, again according to known practices, hardens the surface and reduces the friction which it exhibits to the movement of chips thereover. Such a boradizing treatment apparently establishes an iron boride surface layer on the steel clamp member and thereby imparts the above mentioned desirable characteristics thereto.

When a separate chip breaker is employed, as indicated at 72 in FIG. 7, it is not so highly important for the clamp member to have a hardened chip breaking edge thereon, but when the clamp member is hardened in the described manner, it is possible many times to eliminate a separate carbide chip breaker member and use the clamp member as the chip breaker and thereby maintain the desired extremely low profile of the tool according to the present invention.

It is contemplated that the pin which holds the clamp for the insert could extend completely through the insert support block and into the holder according to the modification of FIG. 4 while an eccentric is provided in each of the block and tool holder as in FIG. 9. With this arrangement, the insert would first be clamped firmly in the block and then the block would be mounted on the tool holder and clamped thereto by its respective eccentric.

This arrangement, similar to that of FIG. 9, would permit ready removal of the block and the insert therein as a unit and would have the advantage that the insert could be preset in a desired position in the block so that blocks with inserts mounted therein would be readily available for exchange when an insert being used became dull.

Modifications may be made within the scope of the appended claims.

We claim:

1. In a turning tool; shank means having an upwardly opening first pocket of substantial size formed therein at one end, a nest member having an upwardly opening second pocket formed therein for receiving a polygonal shim-insert combination with the insert lying on top of the shim while leaving the top face and at least a part of the periphery of the insert exposed, said second pocket having two angularly related surfaces that engage the insert and three angularly related surfaces that engage the shim, said nest member being of substantial size and loosely seated in said first pocket, a clamp member on the nest member having a portion overlying an insert in said second pocket and engaging two surfaces of said insert, said clamp member also having a portion overlying said nest member, a clamp pin extending through said clamp member and said nest member and into said shank means, a head on said clamp pin engaging the side of said clamp member which faces away from said nest member, a notch formed in said clamp pin and a cam rotatable in said shank means and having an eccentric region engaging said notch in said clamp pin and operable to urge said clamp pin in the axially downward direction in said shank means to cause said clamp member to clamp an insert in said second pocket while simultaneously clamping said nest member in said first pocket.

2. A turning tool according to claim 1 in which said first pocket includes an upwardly facing bottom wall which is inclined downwardly relative to the longitudinal axis of said shank means in the axially outward direction.

3. A turning tool according to claim 1 in which said clamp member has a first wall portion adapted for engaging one peripheral portion of an insert in said second pocket, and said second pocket having a second wall portion at an angle to said first wall portion adapted for engaging a second peripheral region of said insert.

4. A turning tool according to claim 1 in which said first pocket is open toward said one end of said shank means and toward one side of said shank means and toward the top of said shank means and is formed by an upwardly facing bottom wall and two side walls, said walls being mutually perpendicular, said bottom wall being inclined to the longitudinal axis of said shank means, said nest member having walls engaging the respective walls of said first pocket, said second pocket having an upwardly facing bottom wall parallel to wall of said nest member which engages the said bottom wall of said first pocket.

5. A turning tool according to claim 1 in which said insert is polygonal when viewed in plan, said second pocket having one side wall portion for engaging a side wall of an insert therein and having a second side wall portion parallel to and spaced from said one side wall portion, said clamp member having a first side wall region at an angle to said one side wall of said second pocket for engaging another side wall of an insert in said second pocket, and a second side wall region on said clamp member facing away from said first side wall region thereof and parallel to and engaging said second side wall portion of said second pocket.

6. In a turning tool, especially for heavy duty turning; a tool shank adapted for being clamped in a tool support with one end projecting therefrom, means at said one end of said shank forming a pocket which opens upwardly and away from said shank, said pocket having an upwardly facing bottom surface and at least one planar side surface generally perpendicular to said bottom surface, said surfaces being adapted to engage the bottom and one side respectively of a cutting insert having parallel top and bottom faces and angularly related sides perpendicular to said faces, a clamp member receivable in said pocket and having a planar side surface engaging another side of the insert, cooperating cylindrical surfaces on said pocket and clamp member for locating said clamp member in said pocket with said side surfaces of said pocket and said clamp member angularly related, whereby a cutting insert of a predetermined size will locate in said pocket against the said side surfaces of the pocket and the clamp member with an edge of the insert remote from the clamp member exposed for engagement with work to be turned, a lip on said clamp member extending over the top face of an insert in the pocket, and clamping means connecting the clamp member to the shank and operable for clamping said clamp member against the top face of an insert in said pocket and for clamping said clamp member to said shank.

\* \* \* \* \*